G. L. GRABE.
WASHING DEVICE.
APPLICATION FILED JULY 14, 1917.
1,293,411.
Patented Feb. 4, 1919.
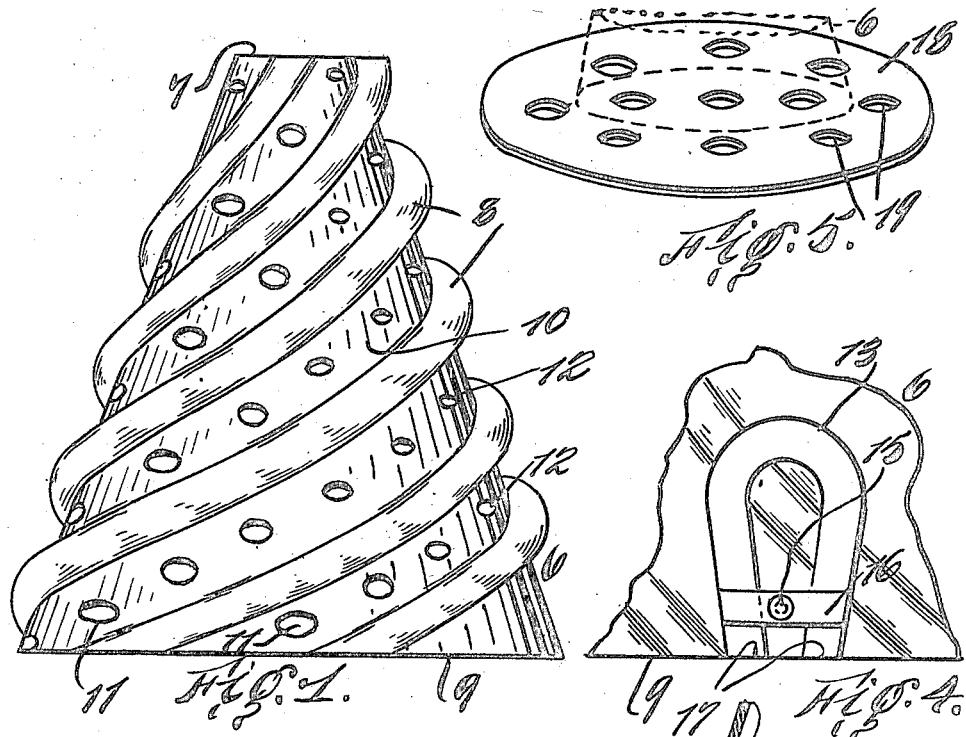
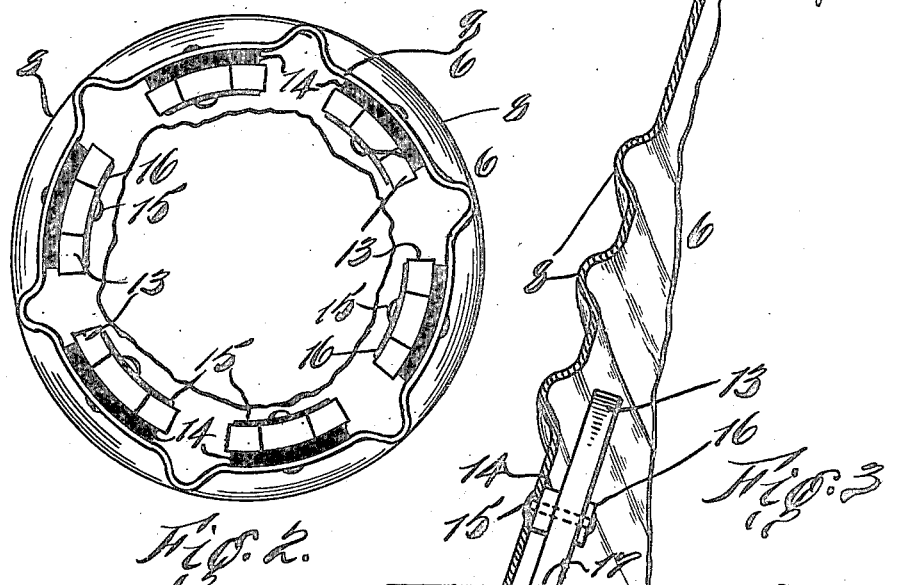
Inventor
Gustav L. Grabe
By his Attorney

UNITED STATES PATENT OFFICE.

GUSTAV L. GRABE, OF TOMPKINSVILLE, NEW YORK.

WASHING DEVICE.

1,293,411.  Specification of Letters Patent.  Patented Feb. 4, 1919.

Application filed July 14, 1917. Serial No. 180,519.

*To all whom it may concern:*

Be it known that I, GUSTAV L. GRABE, a citizen of the United States of America, residing at Tompkinsville, Richmond county, State of New York, have invented certain new and useful Improvements in Washing Devices, of which the following is a full, clear, and exact description.

This invention relates to improvements in hollow conoidal circulating devices for wash-boilers or the like. My improved circulating device is used in combination with any receptacle arranged to contain water and garments or other articles to be cleaned or treated, and is mainly an improvement on the device described in my U. S. Patent, No. 1,189,809, dated July 4, 1916. My present improvement consists chiefly in providing a hollow conoidal circulating device with spirally arranged channels extending from the base of the device to the top thereof, the space between the channels being perforated, said perforations gradually diminishing in size from the bottom upward. In addition, I have provided novel means for holding the device down against the bottom of its container so as to counteract the tendency of the boiling water and steam to displace the same, as will hereinafter more fully appear.

I have found that a better circulation is produced by providing spirally arranged channels or corrugations around the body of the device. The spirally arranged channels retard, to a slight degree, the circulation of the water, thereby retaining the vapors for a somewhat longer period within the conoidal vessel, thus producing better results. The perforations are provided to permit the entrance of water into the conoidal vessel, from which it will be discharged under pressure. The inflow and discharge of the air and water will cause a violent circulation that will increase with the violence of boiling. The violence of circulation will produce a large amount of suds and will also thoroughly cleanse the clothes, &c.

I will now proceed to describe my invention in detail, the novel features of which I will point out in the appended claims, reference being had to the accompanying drawing, forming part hereof, wherein—

Figure 1 is a side elevation of my improved circulating device;

Fig. 2 is a bottom plan view thereof, on a reduced scale, showing the holding down magnets;

Fig. 3 is an enlarged vertical sectional view of a portion of the circulating device;

Fig. 4 is an enlarged fragmentary view, illustrating one of the holding down magnets and a portion of the corrugated wall of the circulating device; and Fig. 5 is a detail perspective view, illustrating a supplemental metal plate to be used in combination with the holding down magnets when the device is used in a vessel having a copper or other non-magnetizable bottom.

My improved washer or circulating device consists of a vessel 6 preferably in the form of a hollow truncated cone, the top of which is open. The vessel or chamber 6 can be connected at the top with any desirable coöperating element, such as a chamber described in my aforementioned Patent No. 1,189,809, but this is not essential and may be omitted.

To carry out the object of the present improvement, I provide the conical body portion of the chamber 6 with a plurality of spirally arranged corrugations or channels 8 extending from the bottom edge 9 of the chamber to the top 7 thereof. The spaces 10 between the channels 8 are provided with a series of perforations, the openings being of varying sizes, the larger openings being indicated by 11 and the smaller by 12. If desirable, the openings may be of a gradually decreasing diameter, commencing with a relatively large opening at the bottom.

A further feature of my improvement is the provision of means to hold the device down against any tendency of the agitation of the water or slight pressure of the steam within the chamber from raising same off the bottom. As the device is usually used in combination with vessels made of tin or sheet-iron, I employ magnets 13, which are carried by the chamber 6 to hold the chamber down against the action of the pressure of the steam to raise same. When the chamber is placed upon the bottom of the vessels, in connection with which it is to be used, the magnets 13 will "adhere" to the bottom of vessel and retain the chamber in place. I have herein illustrated four horse-shoe magnets 13; but I do not limit myself to any particular number or style of magnets.

The magnets 13 are preferably spaced from the wall of the chamber 6 by an interposed block 14 of non-magnetizable substance. To retain the magnets in place upon the wall of the chamber, I may employ a rivet 15 which passes through the wall of the chamber 6, through the block 14 and through a non-magnetizable clamping plate 16. The face 17 of the magnet will be placed in line with the bottom edge 9 of the chamber 6.

Should the vessel employed have a copper bottom or a bottom of non-magnetizable material, I may employ a supplemental bottom-plate 18 (Fig. 5) which is preferably perforated, as at 19. The supplemental plate 18 may be secured to the bottom of the vessel within which the device is placed. A vessel having a copper bottom can in this manner be rendered adaptable to have the magnets attach themselves thereto to hold the chamber 6 in position. Or the plate 18 can be cut in standard sizes and forced into an appropriate sized vessel if desirable. The plate 18 need not be removed after having been once applied. The perforations in the plate serve to permit the radiation of heat into the water; in other words, the plate 18 is perforated in order that it will not impede the action of the heating element. The plate 18 will preferably be larger in area than the bottom of the chamber 6, as indicated by dotted lines in Fig. 5.

For some purposes, magnets may be made heavy enough or independent weights may be employed in their stead, so that their weight alone will, for light work, suffice to hold the device in place.

What I claim as my invention is:

1. A washing device consisting of a hollow conoidal circulating chamber provided at intervals with parallel corrugations or ridges, winding spirally and continuously entirely around it from top to bottom, and with spiral series of perforations between these corrugations.

2. A washing device consisting of a hollow conoidal circulating chamber provided at intervals with parallel corrugations or ridges, winding spirally and continuously entirely around it from top to bottom, and with spiral series of perforations between the corrugations, the individual perforations of each series gradually decreasing in size from the bottom to the top of the device.

Signed at New York city, N. Y. this 12th day of July, 1917.

GUSTAV L. GRABE.

Witnesses:
MAURICE BLOCK,
EDWARD A. JARVIS.

Copies of this patent may be obtained for five cents each, by addressing the "Commissioner of Patents, Washington, D. C."